United States Patent [19]
Morimoto et al.

[11] Patent Number: 5,544,061
[45] Date of Patent: Aug. 6, 1996

[54] NAVIGATION SYSTEM WITH DESTINATION SET BY LONGITUDE AND LATITUDE COORDINATE POINTS

[75] Inventors: Kyomi Morimoto, Nishio; Shoji Yokoyama, Anjo, both of Japan

[73] Assignee: Aisin AW Co., Ltd., Japan

[21] Appl. No.: 250,765

[22] Filed: May 27, 1994

[30] Foreign Application Priority Data

May 28, 1993 [JP] Japan .................................. 5-151318

[51] Int. Cl.$^6$ ................................................ G06F 165/00
[52] U.S. Cl. ........................ 364/444; 364/449; 340/995
[58] Field of Search ..................................... 364/443, 444, 364/449, 450; 340/995; 342/357, 457

[56] References Cited

U.S. PATENT DOCUMENTS

| | | | |
|---|---|---|---|
| 4,763,269 | 8/1988 | Suyama et al. | 364/449 |
| 4,819,174 | 4/1989 | Furuno et al. | 364/444 |
| 4,937,753 | 6/1990 | Yamada et al. | 364/449 |
| 4,943,925 | 7/1990 | Moroto et al. | 364/449 |
| 4,954,959 | 9/1990 | Moroto et al. | 364/449 |
| 5,067,081 | 11/1991 | Person | 364/444 |
| 5,107,433 | 4/1992 | Helldörfer et al. | 364/444 |
| 5,115,399 | 5/1992 | Nimura et al. | 364/444 |
| 5,172,321 | 12/1992 | Ghaem et al. | 364/444 |
| 5,177,685 | 1/1993 | Davis et al. | 364/443 |
| 5,182,555 | 1/1993 | Sumner | 340/905 |
| 5,187,810 | 2/1993 | Yoneyama et al. | 455/34.1 |
| 5,191,532 | 3/1993 | Moroto et al. | 364/449 |
| 5,231,584 | 7/1993 | Nimura et al. | 364/444 |
| 5,307,173 | 4/1994 | Yuen et al. | 358/335 |
| 5,337,244 | 8/1994 | Nobe et al. | 364/449 |
| 5,359,527 | 10/1994 | Takanabe et al. | 364/449 |

FOREIGN PATENT DOCUMENTS

| | | |
|---|---|---|
| 0505152 | 9/1992 | European Pat. Off. . |
| 4219171 | 1/1993 | Germany . |
| 1136014 | 5/1989 | Japan . |
| 2187898 | 2/1990 | Japan . |
| 2210599 | 8/1990 | Japan . |
| 2210600 | 8/1990 | Japan . |
| 375998 | 3/1991 | Japan . |
| 9002391 | 8/1990 | WIPO . |

OTHER PUBLICATIONS

A2122236 44 MOR Nov. 9, 1994.

*Primary Examiner*—Michael Zanelli
*Attorney, Agent, or Firm*—Lorusso & Loud

[57] ABSTRACT

A navigation system has stored route information based upon longitude and latitude point coordinates for being retrieved and displayed to guide a user from a present position to a destination. The point coordinates of the destination are input to the navigation system by manual entry of the longitude and latitude point coordinates, by manual entry of a single multiple-digit alphanumeric code (G-code) containing combined longitude and latitude point coordinates, or by receipt of an external radio, optical, telephone or wire transmission of the longitude and latitude point coordinates from an information center or from a data storage medium such as a magnetic or electronic note card. The longitude and latitude point coordinates or the single multiple-digit alphanumeric code for manual entry can be read from a list of places or a map.

7 Claims, 6 Drawing Sheets

NAVIGATION SYSTEM WITH DESTINATION SET BY LONGITUDE AND LATITUDE COORDINATE POINTS

BACKGROUND OF THE INVENTION

1. Field of the Invention

The present invention relates to a navigation system for guiding a driver to a destination via a predetermined route and, more particularly, to a navigation system having a function to set point data by inputting the absolute coordinates by manual input or by input through data communication.

2. Related Art

A conventional navigation system guides the driver along a route so that he or she can visit a first destination safely by car. In recent years, technology improving performance with regard to precision, operability and visibility of navigation has been vigorously developed, and a variety of systems have been proposed. Typically, a navigation system is equipped with a display screen to be used for setting the route and a display screen to be opened automatically or in response to a demand of the driver for guidance along the route. The display screen, after the start of guidance, provides a section diagram covering a wide range of several Sections including a plurality of sections showing the route, including the section in which the automobile is running, and an intersection diagram for guiding the driver at road intersections.

Some navigation systems provide information such as the remaining distance, intersection name and right or left turn to be made at the intersection, in order to follow the correct route. These systems provide information by which the driver can confirm the route in his or her course and further provide, not only a display, but also audio guidance.

In the conventional navigation system, the starting point and the destination have to be input so as to set the route. When the starting point and the destination are determined by this input, the route is searched for from the neighborhoods of the starting point and the destination and the road information data in between so that the optimum route is selected from a plurality of routes. For example, there have been proposed: a system in which the target position such as the starting point or the destination is classified according to sight-seeing, parking zone or restaurant and is coded according to the area such as the prefecture or city so that the data is input in the form of codes; a system in which menus are displayed so that they may be sequentially selectively input; a system in which node data are connected to define a road network including previously stored position information in terms of the east longitude and north latitude coordinates; and a system in which the telephone number is input.

A telephone number inputting system is exemplified by that disclosed in Japanese Patent Laid-Open No. 187898/1990, and a classification or code number inputting system is exemplified by that disclosed in Japanese Patent Laid-Open No. 173820/1989. In Japanese Patent Laid-Open No. 1738223/1989, on the other hand, there is disclosed a system in which a destination is set in terms of code numbers which correspond to previously stored coordinate data for destinations as the destination information.

However, the destination inputting system of the prior art cannot always set the destination the driver desires to reach. In case, for example, the destination is to be set at the house of a friend, the telephone number of the friend has to be registered in the navigation data according to the telephone number inputting system. However, it frequently occurs that the telephone number of the friend's house is not registered. Thus, the map displayed shows, as a representative point, the area covering the friend's house where the local office number coincides. The natural result is that the displayed map covers such a wide area as to make it difficult to identify the location of the friend's house. To overcome this difficulty, it is sufficient to register the telephone number of the friend's house, but the amount of data increases so much that the cost becomes extremely high.

On the other hand, a code number inputting system can set the destination precisely. In order to allow the user to set a number of unspecified destinations such as a friend's home, however, the unspecified destinations must be coded one by one. When the data codes are input they must be converted into point information. Then, there arises a problem that the user has to pay the costs for the encoding process and for the device for storing the data.

SUMMARY OF THE INVENTION

An object of the present invention is to provide a simply constructed navigation system which can set a number of unspecified or unregistered destinations.

In order to achieve this object, according to a first embodiment of the present invention, there is provided a navigation system for guiding a user to a destination in accordance with a predetermined route, including: point coordinate input means for inputting, either by touch through a screen or by voice data in the form of point coordinates, which are acquired from either an absolute coordinate list, prepared to correspond to input information of the destination, or a map having the absolute coordinates recorded therein; destination setting means for setting the destination on the basis of the input point coordinate data; and display means for displaying the set point of the destination on a route guidance map.

According to a second embodiment of the present invention, there is provided a navigation system similar to the first aspect, but the input point coordinates are abbreviated codes for the absolute coordinates.

According to a third embodiment of the present invention, there is provided a navigation system according to the first embodiment, wherein the input screen includes a touch screen and/or keyboard for inputting the longitude and the latitude; and a display for showing the input longitude coordinate and latitude coordinate.

According to a fourth embodiment of the present invention, there is provided a navigation system for guiding a user to a destination in accordance with a predetermined route, comprising: point coordinate input means for inputting transmitted data identifying point coordinates, which are acquired from either a list of absolute coordinates matched with destination information or a map having the absolute coordinates recorded therein; point coordinate receiving means for receiving the point coordinate data transmitted from a remote location; destination setting means for setting the destination on the basis of the point coordinate data received; and display means for displaying the set point of the destination on a route guidance map.

According to a fifth embodiment of the present invention, there is provided a navigation system according to the fourth embodiment, wherein the point coordinates are retrieved from an information center for storing the point coordinate information corresponding to the destination information and for transmitting the point coordinate data in response to a demand of the user.

According to a sixth embodiment of the present invention, there is provided a navigation system according to the fourth embodiment, wherein the point coordinate data is retrieved from data storage means for storing the point coordinate information corresponding to the destination information by operation of the user.

The point coordinate data for the destination are acquired from a coordinate list, a map or information center, and the point coordinates are input through the screen or by the voice through the operations or communications of the user. Then, the point setting is processed in a manner to correspond to the destination so that the input point is displayed in the screen.

According to the present invention, the destination data stored in the conventional navigation system can be eliminated and thus requires neither the space for storing the data nor the memory space for storing the data temporarily in the central control section so that the structure can be made compact.

If an information center is used, the user is freed from the trouble of the search which might otherwise be performed by the user, so that the burden is removed from the user while shortening the searching time period. In the case of input through data communication, moreover, no manpower is required and the setting operation is thereby simplified.

BRIEF DESCRIPTION OF THE DRAWINGS

FIG. 6(a) shows a system using wired communications, and FIG. 6(b) shows a system using optical communications;

DESCRIPTION OF THE PREFERRED EMBODIMENTS

Figure 1:
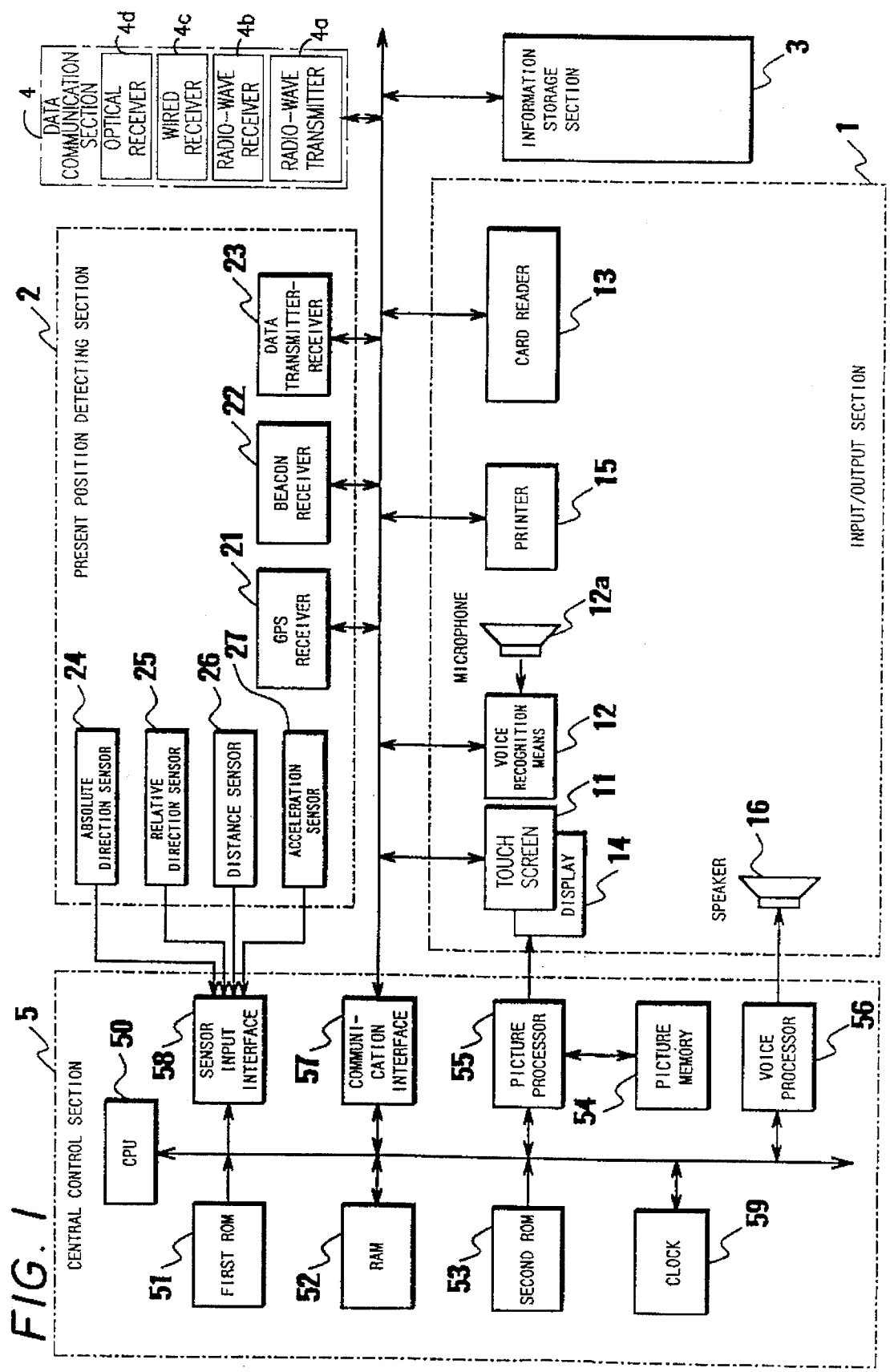
FIG. 1 is a block diagram showing one embodiment of a navigation system according to the present invention.

Here will be described embodiments of the present invention with reference to the accompanying drawings. FIG. 1 shows a system construction of a navigation system having a function to set a point using absolute coordinates.

The navigation system shown in FIG. 1 includes: an input/output section 1 for inputting/outputting information concerning route guidance; a present position detecting section 2 for gathering information concerning the present position of an automobile; an information storage section 3 for storing navigation data necessary for calculating the route and display guide data necessary for guidance; a data communication section 4 for sending/receiving the navigation data to/from an information source such as an information center or an electronic note card; and a central control section 5 for processing a route search and a display/guidance information or data necessary for the route guidance and for controlling the entire system.

The input/output section 1 functions to instruct the central control section 5 of the intention of the user so that the guidance information may be given by voice and/or displayed on the screen when requested by the driver, and to output the processed data or data communications to a printer. In order to realize these functions, the input section is composed of: a keyboard or a screen touch device 11 for inputting a destination in terms of telephone numbers or coordinates or requesting a route guide; a voice recognition unit 12; a card reader 13 for reading data recorded in an electronic note card such as an IC card or a magnetic card. On the other hand, the output section is composed of: a display 14 for displaying the input data on the screen or for displaying the route guide on the screen in response to the request of the driver or in an automatic manner; a printer 15 for printing the data processed by the central control section 5, the data stored in the information storage section 3, or the communication data sent from an information center or the like; and a speaker 16 for outputting the route guide in audio.

The display 14 is a color CRT or a color liquid crystal display and displays a number of screens in color, including screens necessary for the navigation, such as the route setting screen, section screens or road intersection screens based upon the map data or the guide data processed by the central control section 5, and buttons for setting the route guide, guidance along the route and switching the screen. Especially, information regarding the intersection being passed, such as the name of the intersection, is temporarily popped up in colors on the section screen.

This display is mounted in the instrument panel near the driver's seat so that the driver can look into the section diagram to confirm the present location of the automobile and to acquire information on the route to follow. The display 14 is equipped with the touch screen or switch matrix 11 corresponding to the indications of function buttons so that the aforementioned operations are executed on the basis of the signals input by the touch screen 11. The input signal generating means thus composed of the touch screen and so on constitutes the input section, a detailed description of which will be omitted.

The voice recognition means 12 constitutes the input signal generating means for generating a signal to be processed by the central control section 5 by recognition of the coordinate information input by the voice of the user through a microphone 12a.

The present position detecting section 2 includes: a GPS receiver 21 utilizing the global positioning system (GPS); a beacon receiver 22; a data transmitter-receiver 23 for receiving the corrected signal of the GPS utilizing the cellular phone or FM multiplex signals; an absolute direction sensor 24 composed of a terrestrial magnetism sensor; a relative direction sensor 25 composed of a wheel sensor or a steering sensor; a distance sensor 26 for detecting the covered distance from the number of revolutions of the wheels; and an acceleration sensor 27.

The information storage section 3 is a database containing all the data including map data, display guide data and voice guide data that are necessary for the route guidance.

Moreover, the data communication section 4 communicates by data transmission with an external information center in response to the request of a user. The external information center contains an extensive store of route guidance information and destination identification information with corresponding point coordinate data. By transmitting a request with destination identification information, the communication section 4 can receive in return the point coordinates of the destination. Similarly, point coordinates can be retrieved from the electronic note card or IC card using destination information. Destination information can be stored in advance in the electronic note card or IC card and retrieved by the user to transmit to the information center which, based on the destination data, determines the point coordinates and transmits the point coordinates to the communication section 4. The data communication section 4 has a data transmission section which includes a variety of communication means. For example, the data communication section 4 has a data transmission section composed of various communication means, exemplified in the present embodiment by a radio-wave transmitter 4a, a radio-wave receiver 4b, a wired communication receiver 4c and an optical communication receiver 4d.

The central control section 5 includes: a CPU 50 for executing arithmetic operations; a first ROM 51 which stores programs for searching routes, programs for display controls necessary for route guidance and programs for voice output controls necessary for voice guidance, and the data necessary for operation of the programs; a RAM 52 for temporarily storing the guide information being searched and the data being processed; a second ROM 53 which stores the display information data necessary for the route guide and the map display; a picture memory (V-RAM) 54 which stores the video data to be used for displaying a picture; a picture processor (display controller) 55 for retrieving the video data from the picture memory as directed by the display control signal coming from the CPU and for processing the video data and outputting the processed picture to the display; voice processor 56 for synthesizing and converting voice, phrase, sentence and sound data, which are read out of the information storage section 3, into analog signals in accordance with the voice output control signal coming from the CPU and for outputting the analog signals to the speaker; a communication interface 57 for transferring the input/output data through data communication; a sensors input interface 58 for receiving the sensor signal of the present position detecting section 2; and a clock 59 for synchronizing input of internal timing of the central control section 5. The driver can select the route guide from either the screen display or the voice output.

The present system determines the present position by calculating a deduced position on the basis of the various sensor signals and the GPS data coming from the present position detecting section 2 and by determining the location on the road from the correlations between the deduced position, and the map location of the road and the GPS data. Here, the present position is not indicated on the road displayed on the map if the correlation with the road data displayed on the map is poor.

The present system further functions to decide whether a predetermined guide point is approached by the moving position of the user's automobile, in context of the route from the present position to the destination. Specifically, this function decides the timing for automatically outputting the predetermined distance before the road intersection on the guide route and the passage of the intersection as voice outputs and for outputting intersection information such as the name of intersection passed. On the basis of this decision, the system provides guidance instructions via the picture processor and the voice processor. In response to the input of the request signal, moreover, the system instructs the voice processor as to audio output of the present position.

Here will be described the point setting function, according to the absolute coordinates, of the present invention. The acquisition of the point coordinate of the destination can be from memory means such as a coordinates list, map, information center or electronic note card. Moreover, the point coordinate information retrieved from memory is set in the navigation system by inputting through the screen or by voice or is automatically set by execution of the point setting program.

Figure 2:
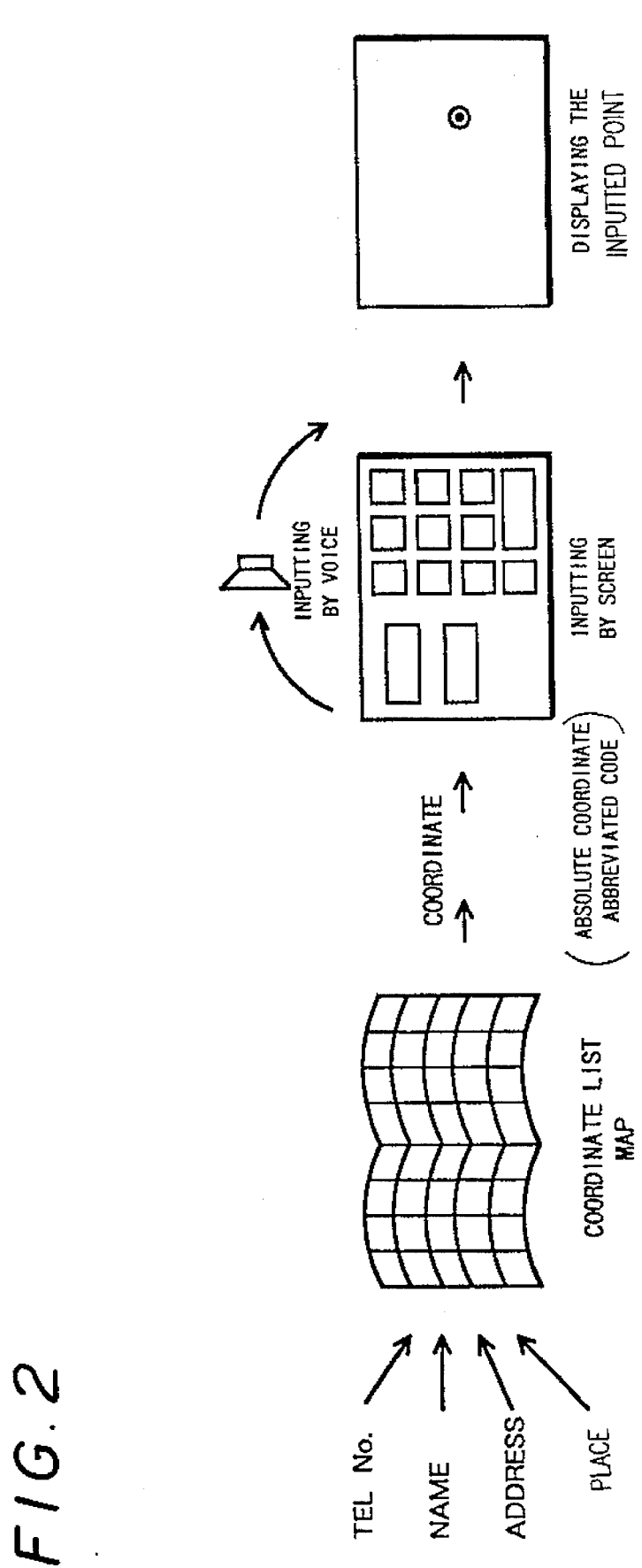
FIG. 2 is a schematic diagram showing a system for setting point coordinates by a screen input or a voice input.
Figure 4:
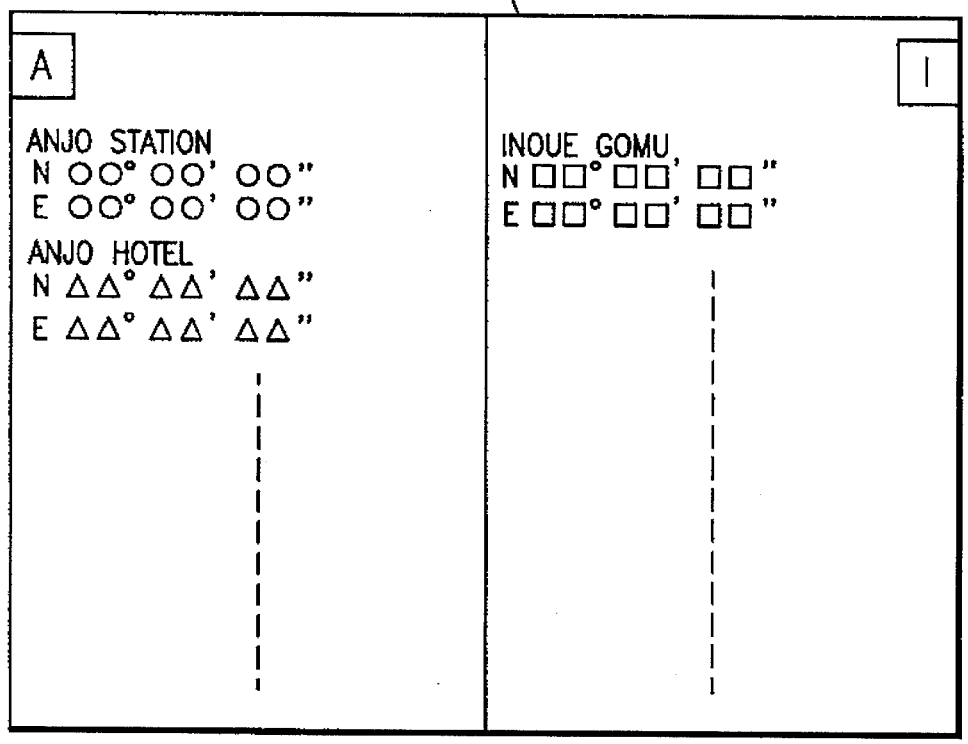
FIG. 4 is a diagram showing one example of a coordinate list correlating telephone numbers, addresses, names and places with absolute coordinates.
Figure 5:
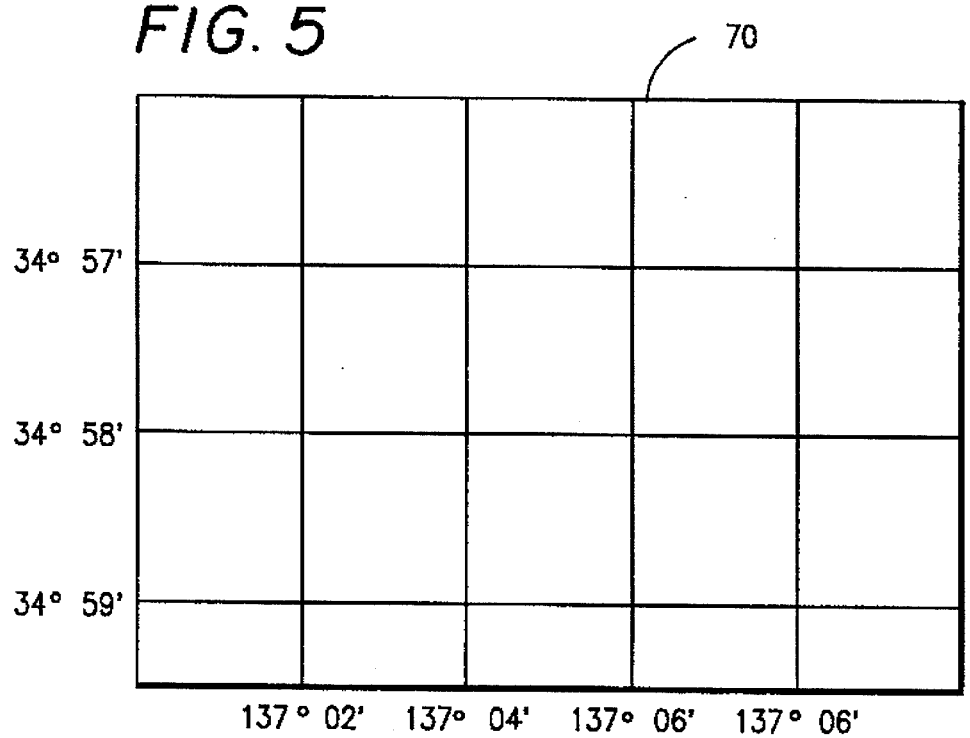
FIG. 5 is a diagram construction of a map illustrating the absolute coordinates.

FIG. 2 shows a system which sets the point coordinates by screen or voice input. First of all, the point coordinates of the destination are retrieved from the coordinate list stored in correlation with the telephone number, the address, the name or the place corresponding to the absolute coordinates, such as the stored coordinate list correlating the absolute coordinates with locations, as shown in FIG. 4, or a map bearing the absolute coordinates, as shown in FIG. 5. When the point coordinates of the destination are retrieved, they are input through the screen or by the voice. The central control section determines the point from the map data stored in the information storage section on the basis of the input coordinate information for the destination and displays it on the map screen. Incidentally, the point coordinates of the destination may be input by entering from a list or map an abbreviated code such as a single multiple-digit numeric code like that known under the trademark "G-code" of Gemstar Development Corporation but containing combined longitude and latitude coordinates.

According to the present embodiment, an existing information source such as the map can be easily utilized by the input operations.

Figure 3:
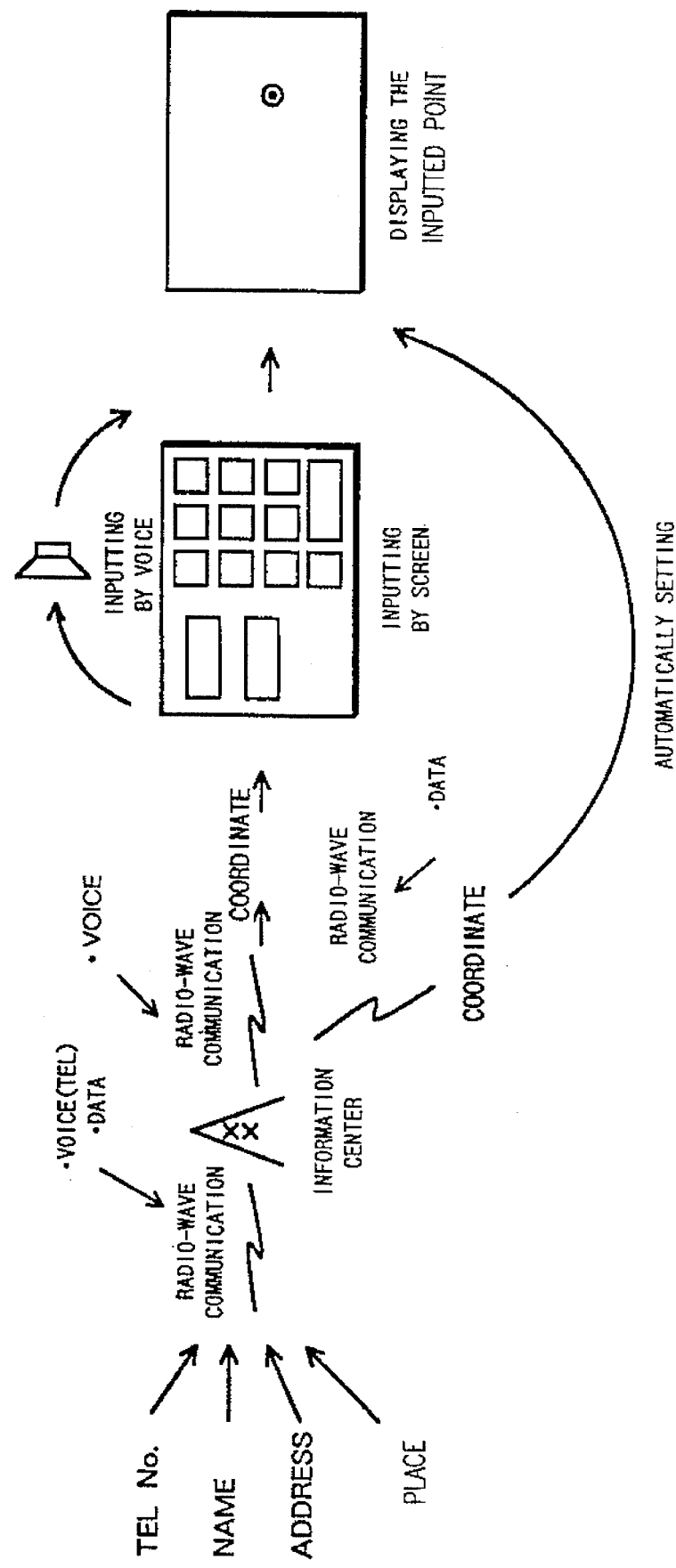
FIG. 3 is a schematic diagram showing a system for manual input or automatic setting on the basis of the point coordinate information which is transmitted from an information center in response to an inquiry of a user.

FIG. 3 shows a system for the operation of inputting or automatic setting, on the basis of the point coordinate information sent from the information center in response to the inquiry of the user.

The information center is usually a stationary station and functions to store the data necessary for navigation and to transmit the necessary data in response to a demand of the user. The user sends the destination information such as the telephone number, the name, the address or the place to the information center through a voice telephone or data transmission by radio-wave communication. The user is taught the demanded point coordinate data from the information center by telephone and inputs the point coordinate data by voice or through the screen. Alternatively, the user receives the coordinate data sent from the information center through the receiver and processes it to determine the point if it is provided with the function of automatically setting the coordinate data received by the navigation system.

Figure 6A:
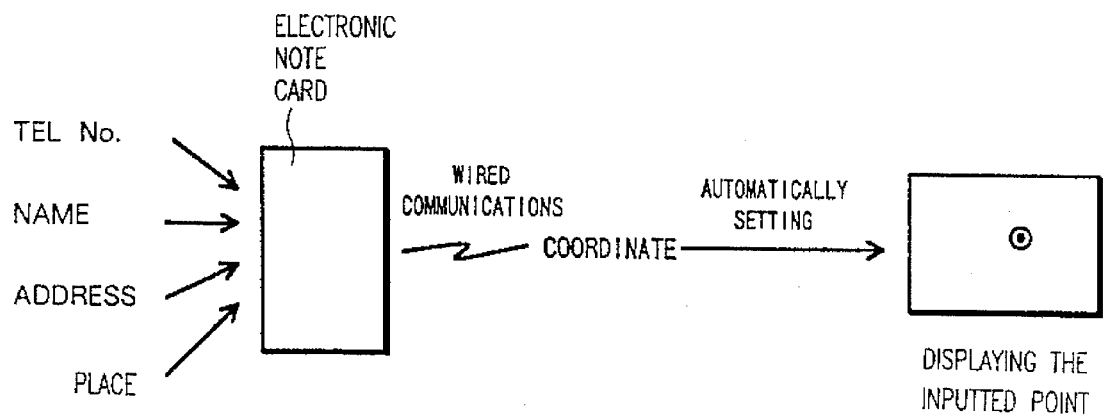
FIGS. 6(a) and 6(b) are schematic diagrams showing systems for automatically setting the point coordinate data, which are stored in an electronic note card, by inputting destination data for conversion to the point coordinate data to be sent to the navigation system.
Figure 6B:
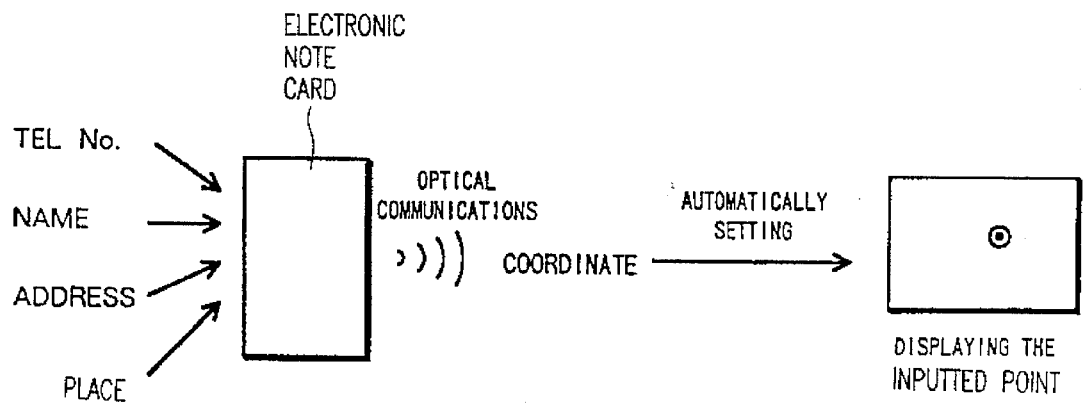

FIGS. 6(a) and 6(b) show systems for sending the coordinate data stored in a electronic note card by transferring the destination data to the navigation system by wired communication, as shown in FIG. 6(a), and/or by optical communication, as shown in FIG. 6(b), to set the coordinate data automatically.

The electronic note card is a portable database composed mainly of input means for the destination data, memory means stored with the coordinate data corresponding to the destination data, and communication means for transmitting the coordinate data. The portable database is exemplified by a record card, such as an IC card or magnetic card. In this modification, the input/output section is equipped with a card reader.

The communication means either transmits the coordinate data by connecting the electronic note card shown in FIG. 6(a) and the navigation system through a communication cable or operates light emitting means at the side of the electronic note card, as shown in FIG. 6(b), and light receiving means at the side of the navigation system, to convert the point coordinate data into optical data and to transmit the optical data.

If the point coordinates of the destination are to be set, the coordinate data are outputted to the navigation system when the destination data are input into the electronic note card. Then, the navigation system displays the point based on the input coordinate data.

Figure 7:
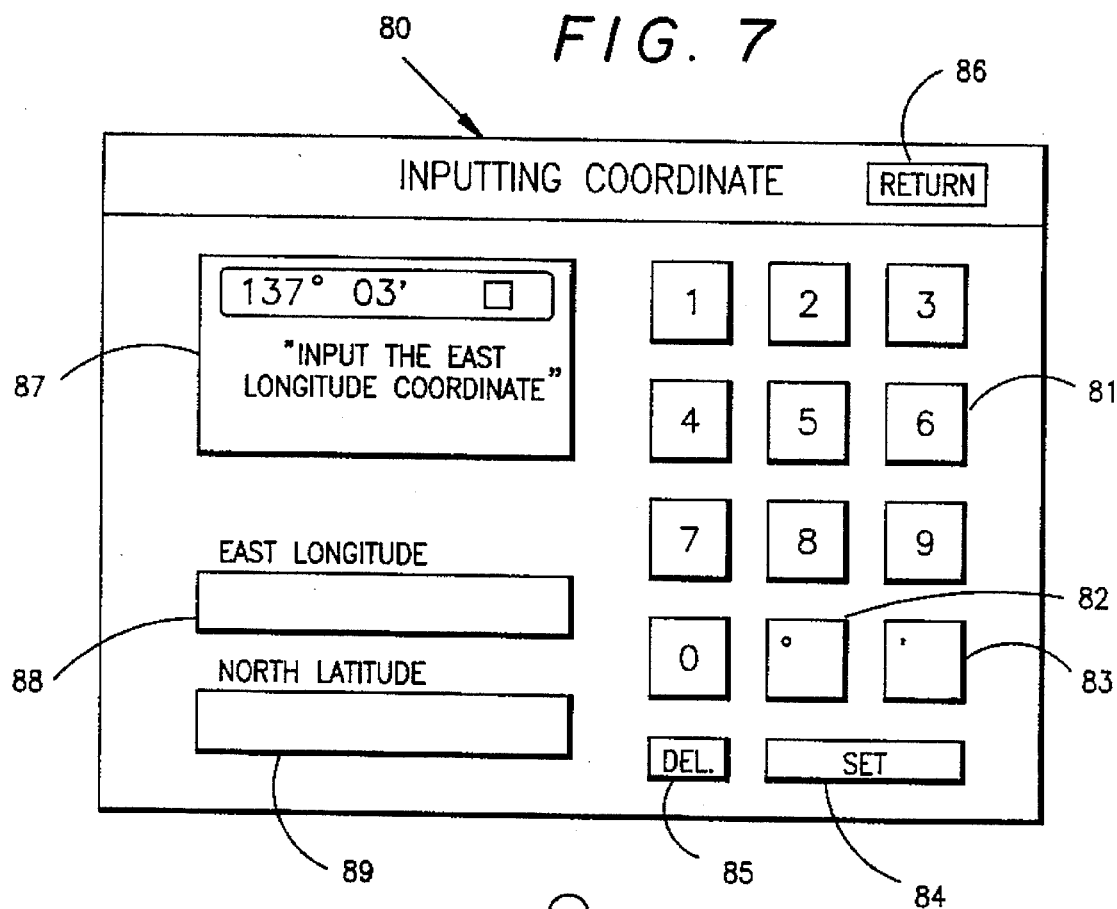
FIG. 7 is a schematic diagram showing one example of the layout of a coordinate inputting screen.

Here will be described a screen for input of the coordinates. FIG. 7 shows one example of a layout for the coordinate input screen. This input screen is opened by depressing the coordinate input button after the destination setting button has been depressed in the menu of the destination setting screen, although not shown.

Figure 8:
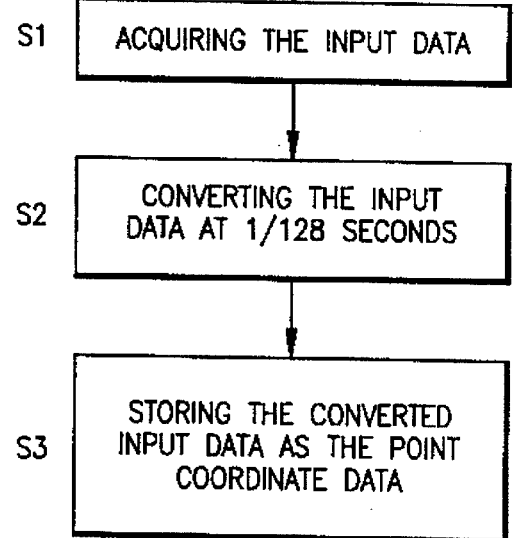
FIG. 8 is a flow chart showing a procedure for setting the point coordinate data.

A coordinate input screen 80 is formed with: ten keys 81 for inputting the coordinate data; a degree key 82 and a minute key 83 for selecting the inputs of the longitude and latitude; a set completing key 84 for fixing the data after the coordinates have been input; a delete key 85 for deleting the input data; a return key 86 for returning to the screen (i.e., the destination setting screen) preceding the present screen; a monitor area 87 for displaying the coordinate data being input; and an east longitude indication area 88 and a north latitude indication area 89 for indicating, respectively, the east longitude and the north latitude coordinates input. In the present example, the monitor area 87 is displayed with the message for instructing the inputting, e.g., "input the east longitude coordinate," at the time of inputting the east longitude coordinate, Here will be described the setting of the point coordinate data with reference to FIG. 8. When the input data in the form of point coordinate information is acquired (at S1), either by manual operation using the screen, by voice or by data communication via radio-wave communication or optical communication, the point coordinate values are converted to predetermined units such as 1/128 seconds (at S2). The input data thus converted are stored as the point coordinate data (at S3). Then, the point is displayed on the map by processing the point indication of the destination.

What is claimed is:

1. A navigation system for guiding a user to a destination in accordance with a predetermined route, comprising:

storage means containing route information which can be accessed by longitude and latitude coordinates;

communication means for transmitting a request for destination information and for receiving externally transmitted signals comprising longitude and latitude coordinates;

destination setting means responsive to the receipt of the externally transmitted signals for automatically setting a destination point of said destination on the basis of the received longitude and latitude coordinates;

means responsive to the automatic setting of the destination point for retrieving selected route information from the storage means; and display means for displaying the set destination point of said destination on a route guide map composed from the retrieved route information.

2. A navigation system according to claim 1, wherein said communication means transmits the request to an information center which contains the longitude-and latitude coordinates and which transmits the longitude and latitude coordinates in response to the transmitted request from the communication means.

3. A navigation system according to claim 1, wherein said longitude and latitude coordinates are received by transmission from a data storage medium which stores the longitude and latitude coordinates.

4. A navigation system according to claim 3 wherein the communication means comprises a card reader.

5. A navigation system according to claim 4 wherein the data storage medium comprises a magnetic card.

6. A navigation system according to claim 4 wherein the data storage medium comprises an electronic note card.

7. A navigation system according to claim 1, wherein said communication means transmits the request to a memory device which contains the longitude and latitude coordinates and which transmits the longitude and latitude coordinates in response to the transmitted request from the communication means.

\* \* \* \* \*